Aug. 22, 1961  F. R. MORTIMER  2,997,059
FLUID-PRESSURE DAMPERS
Filed Nov. 19, 1957
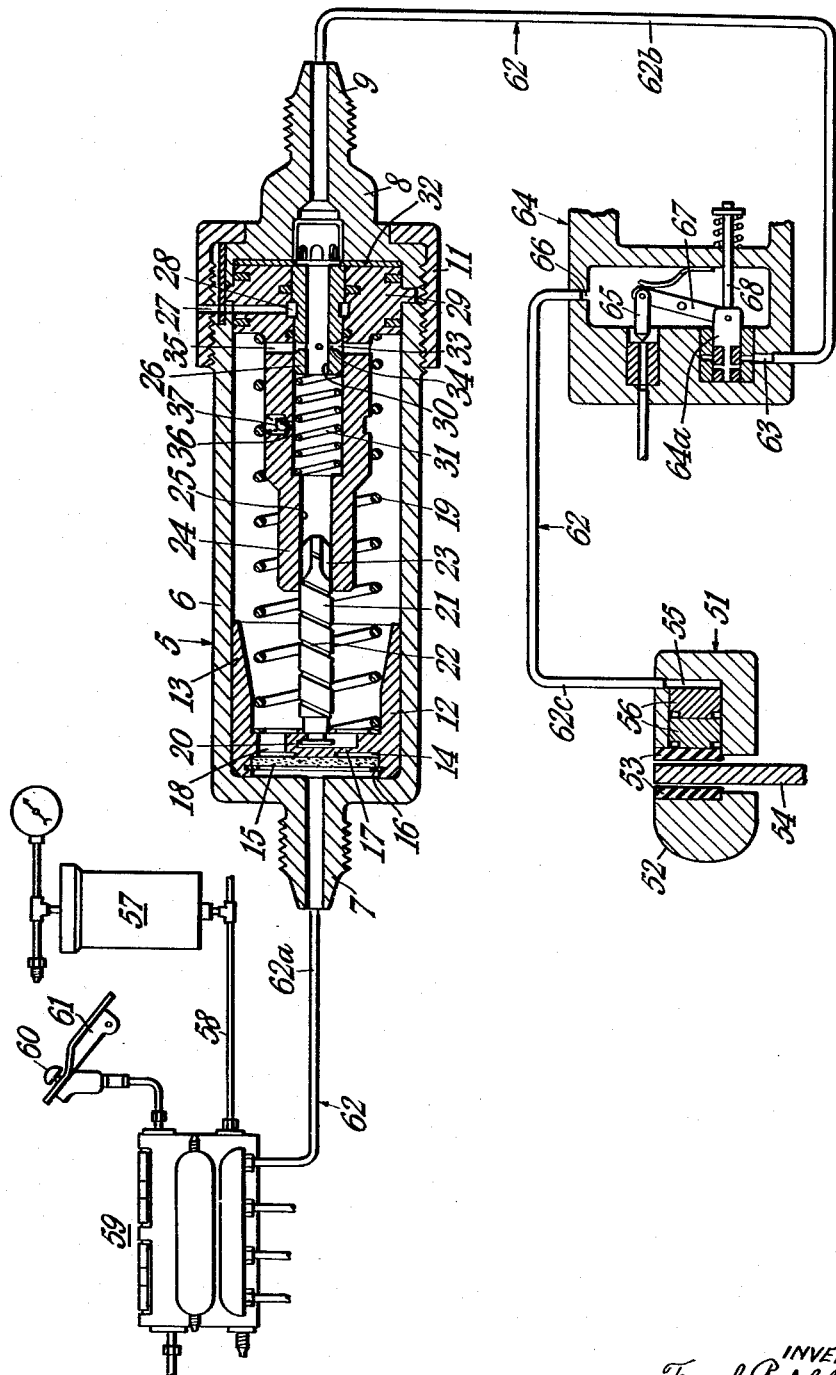
INVENTOR.
Frank Radcliff Mortimer
by Benj. T. Rauber
his attorney

United States Patent Office 2,997,059
Patented Aug. 22, 1961

2,997,059
FLUID-PRESSURE DAMPERS
Frank Radcliffe Mortimer, Styvechale, Coventry, England, assignor to Dunlop Rubber Company Limited, London County, England, a British company
Filed Nov. 19, 1957, Ser. No. 697,358
12 Claims. (Cl. 137—505.13)

This invention relates to fluid-pressure dampers and more particularly to fluid-pressure dampers for aircraft braking systems incorporating an automatic brake-control apparatus for preventing skidding or sliding of the aircraft wheels.

It is well known to provide aircraft with retractable landing wheels and fluid-pressure operated wheel braking systems whereby, upon landing, the wheel brakes are applied by the pilot of the aircraft, the degree of application of said brakes depending upon the pressure applied by the pilot to the brake pedal, pedals or other device whereby a brake control-valve mechanism is operated.

It is also known to apply to such braking systems an automatic brake-control apparatus whereby, and irrespective of any extreme pressure applied by the pilot, the brakes are prevented from locking the wheels of the aircraft.

It has been found that such automatic brake-control apparatus, when fitted to certain types of aircraft, is inclined to intensify judder or vibration of the oleo struts when the aircraft is landing and the brakes are applied. It is thought that this is due to the leg flexing when the brake is applied and flexure of the leg relative to the aircraft alternately accelerating and decelerating the wheel. This in turn actuates the automatic brake-control apparatus which responds by checking and releasing braking pressure in sympathy with the flexing of the leg. Thus the natural period of the leg and its attachment is excited and in a very short time a heavy vibration or judder sets in over all the aircraft.

However, judder of this nature is not necessarily started by automatic brake-control apparatus of the type described. It is often self-excited.

The object of the present invention is to provide a fluid-pressure damper for smoothing-out pressure surges of this nature.

Another object of the invention is to provide a braking system wherein vibration or judder due to pressure surges is largely overcome.

According to the invention, a fluid-pressure damper comprises a housing having an inlet adapted to communicate with a source of fluid-pressure and an outlet adapted to communicate with a fluid-pressure operated device, means to enable fluid from the source initially to flow freely through the housing to said device, means to prevent said flow when the pressure in said device attains a predetermined value and means thereafter to cause fluid from the source to flow through a restrictor mechanism which progressively damps pressure surges and the like between said source and said device.

The fluid-pressure damper preferably comprises an annular piston stepped to two diameters and slidable in the stepped bore of a tubular member located in said housing with the larger diameter end of said bore lying adjacent the outlet end of the housing. The smaller diameter end of the piston is formed as a slide valve to cooperate with passages extending radially through the tubular member and communicating with the interior of the housing. With these passages blocked by the piston, pressure-fluid from the inlet is constrained to pass into the tubular member and thence to the automatic brake-control apparatus through the restrictor mechanism, which comprises a helically-grooved plunger slidable into the adjacent end of the tubular member.

According to the invention also, a fluid-pressure operated braking system for aircraft having wheel brakes associated with a rotary-inertia automatic brake-control apparatus and a fluid-pressure control-valve mechanism for applying said brakes, comprises a fluid-pressure damper as hereinabove defined interposed in a fluid-pressure conduit between said control-valve mechanism and said rotary-inertia automatic brake-control apparatus.

But a better understanding of the invention may be obtained from the following description when this is read with reference to the accompanying drawing which is a longitudinal section through a hydraulic damper according to the present invention, with other portions of a conventional braking system shown in diagrammatic form.

In the drawing which accompanies the present specification the braking system is illustrated as comprising a fluid-pressure operated brake 51 comprising a housing 52 secured to a non-rotatable portion of the aircraft, adjacent a landing wheel thereof, in such a manner as to hold pads 53 of friction material adjacent the opposite radial faces of a disc 54 which is associated with the respective landing wheel (not shown) in such a manner as to be rotatably driven thereby. The pads 53 of friction material are adapted to be forced into frictional engagement with the opposite radial faces of the disc 54 by the admission of fluid-pressure into the space 55 behind the pistons 56 of a fluid-pressure operated piston and cylinder device of the type known to be used in such brakes. One such brake is associated with each landing wheel of the aircraft.

Fluid-pressure for the operation of the brakes is provided from a high-pressure accumulator 57 which is charged by a suitable fluid pump (not shown) of known type, and the fluid-pressure in the accumulator 57 is conveyed through a conduit 58 to a brake control-valve mechanism 59, which may conveniently be of the type more fully described in British patent specification No. 687,358. The brake control-valve mechanism 59 is under the control of the pilot of the aircraft who, by pressing the foot control 60 on the pedal 61, may divert fluid-pressure from the accumulator 57 through the brake-operating conduit 62 to the space 55 to apply the brake 51. A similar pedal 61 and foot control 60 is provided for the operation of the brake on the opposite landing wheel of the aircraft, but as the arrangement for the port and starboard landing wheels is the same, only one such arrangement is described herein. The control-valve mechanism 59 also comprises means providing for emergency operation of the brakes, but as these form no part of the present invention they are not described herein.

The hydraulic damper 5 of the present invention is interposed in the fluid-pressure conduit 62 between the sections 62a and 62b thereof, as will be described hereunder, and the section 62b is connected to the inlet 63 of a rotary-inertia automatic brake-control apparatus 64 of the type more fully described in Patent No. 2,656,017. In its details which most closely concern the present invention, the brake-control apparatus comprises an inlet valve 64a, an exhaust valve 65 and an outlet 66, which latter is connected by the conduit section 62c with the fluid-pressure space 55 of the brake 51. The inlet and exhaust valves 64a and 65 are connected by a pivoted lever 67 which is adapted to be pivoted to close the inlet valve 64a and open the exhaust valve 65 through a cam-operated rod 68 upon excessive deceleration of the associated landing wheel upon a skidding or sliding tendency developing in the wheel due to excessive application of the brake or insufficient adhesion of the wheel with the landing surface. The rod 68 is spring-urged in a direction to open the inlet valve 64a and close the exhaust valve 65, so that unless the landing wheel is subject to excessive deceleration, i.e., deceleration at a rate greater than can be absorbed by its adhesion with the landing surface, the brake-control apparatus 64 permits the free flow of fluid-pressure from the brake control-valve mechanism 59 to the brake 51.

In the practical landing of an aircraft, however, there is a normal tendency on the part of the pilot to over-apply the brakes and this, in association with the normal variations in adhesion between the tyres and the ground due to oil, water, mud and/or ice patches and the like, causes a rapid "hunting" of the rod 68 as the wheels tend to skid or lock and are automatically released, and a consequent rapid opening and closing of the valves 64a and 65, and unless this is controlled it causes pressure surges in the conduit section 62c and the consequent development of judder and vibration in the oleo-strut and aircraft, as referred to hereabove.

To avoid the development of this condition a fluid-pressure damper 5 is interposed in the pressure line 62 between the brake control-valve mechanism 59 and the automatic brake-control apparatus 64. The fluid-pressure damper 5 comprises a cylindrical housing 6 having at one end an inlet connection 7 leading to the conduit section 62a and thence through the control valve 59 to the fluid-pressure accumulator 57. The other end of the housing 6 is open, and to the open end is fitted an annularly-skirted cup-like closure member 8 from which an outlet connection 9 extends axially-outwardly and leads to the conduit section 62b and thence to the inlet 63 of the automatic brake-control apparatus 64. The closure member 8 is fluid-tightly secured to the housing 6 by a screw-threaded ring nut 11 which engages with a mating screw-thread on the outer periphery of the housing 6.

A piston-like skirted guide member 12 is slidably fitted in the housing adjacent the inlet connection 7, the skirted portion 13 thereof extending axially-inwardly of the housing. A recess 14 is formed in the end of the guide member 12 adjacent the inlet connection 7 and into this recess 14 is fitted a porous filter 15 which is held in position by a circular spring clip 16. The head 17 of the guide member is in the form of a spider whereby fluid passages 18 are provided from the inlet connection 7, through the filter 15, into the interior of the housing 6. The guide member 12 is urged towards the inlet end of the housing by a helical compression spring 19.

In a central boss 20 of the guide member 12 is secured a plunger 21 which extends co-axially towards the outlet end of the housing 6 for substantially half its length. The plunger 21 has a helical groove 22 formed in its periphery substantially throughout its length, and the end of the plunger 21 remote from the guide member 12 is bluntly tapered and provided with short flutings 23 which are of substantially arcuate form at their bases and taper abruptly towards the periphery of the plunger 21 at a point thereon which substantially coincides with the adjacent end of a tubular member 24. The tubular member 24 extends axially-inwards from the outlet end of the housing 6 and has a central bore 25 in which the end of the plunger 21 is received. The bore 25 of the tubular member 24 is of three different diameters, the plunger 21 being slidable in the smaller diameter portion thereof. The larger diameter portion of the bore 25 lies adjacent the outlet end 9 of the housing 6, and in this portion, and in the intermediate diameter portion, a stepped piston 26 is fluid-tightly slidable. A vent 27 leads from an annular recess 28, formed in the bore 25 at the junction of the large and intermediate portions thereof, to atmosphere through a large diameter portion 29 of the tubular member 24, which portion 29 is fluid-tightly held in the housing 6 between the end of the housing and the radial face of the skirted portion of the closure member 8.

A passage 30 extends axially through the piston 26 co-axially of the bore 25 and the passage through the outlet connection 9, and the piston 26 is normally urged towards the outlet connection 9 by a helical compression spring 31 located in the intermediate portion of the bore 25, movement of the piston 26 towards the closure member 8 being limited by a washer-like abutment member 32 held between the tubular member 24 and the closure member 8.

When the piston 26 is in abutment with the member 32 an annular groove 33 formed around its smaller diameter portion and communicating with the bore 30 by a plurality of radial passages 34, is in register with a plurality of radial passages 35 formed in the tubular member 24 and communicating with the interior of the housing 6. A radial passage 36 is also formed in the wall of the tubular member 24 axially-intermediate the piston 26 and the end of the plunger 21, and this passage 36 is provided with a spring-loaded ball relief valve 37 which is disposed so as to prevent the flow of liquid from the interior of the housing into the passage 25 but to permit flow in the reverse direction.

Suitable sealing rings and gaskets are provided as, and where, necessary in the known manner.

In the operation of the device, as the aircraft lands and the landing wheels rotate, the pilot operates his brake control 60 in the known manner and fluid-pressure is directed from the accumulator to the inlet connection 7 of the fluid-pressure damper 5 through the control-valve 59 and conduits 58 and 62a. Fluid-pressure enters the interior of the housing 6 and passes through the passages 35 in the tubular member 24 and the passages 34 in the piston 26 to the outlet connection 9 and the inlet 63 of the automatic brake-control apparatus 64. Fluid-pressure also flows down the groove 22 on the plunger 21, and as this is only slightly entered into the bore 25 the resistance to flow offered by the groove 22 is only slight, and there is little pressure drop between the interior of the housing and the bore 25.

This causes the brake 51 to be lightly applied and as fluid-pressure builds up in the brake and the outlet end of the housing 6 the piston 26 is gradually moved, by the pressure acting upon the larger diameter end thereof, against the spring 31 until, when a predetermined pressure in the outlet connection 9 is reached, the piston 26 has moved sufficiently to block the passage 35; movement of the piston is limited by the larger diameter portions of the piston seating on the step formed at the junction of the larger and intermediate bore portions of the tubular member 24. The pressure necessary to cause this to occur, i.e. the "predetermined pressure," can be varied by variations in the rating of the spring 31.

The damper thus allows the substantially-free flow of pressure-fluid to the automatic brake-control apparatus 64 upon the initial operation of the brake-control 60 by the pilot, and thus enables the brake clearances to be quickly taken up. Once these clearances are taken up, however, the further pressure-fluid necessary to cause full application of the brakes is constrained to pass along the helical groove 22 by the closure of the passages 34, 35.

If the brake is applied so fiercely, or if the landing conditions are such, that the wheel tends to skid or slide, the automatic brake-control apparatus 64 will function as described hereabove and in Patent 2,656,017 to open the exhaust valve 65 and close the inlet valve 64a to release the brake pressure momentarily at a point before actual skidding or sliding takes place, so that the wheel will again rotate normally, and then automatically to open the inlet valve 64a and close the exhaust valve 65 to re-apply the brake as soon as the skidding or sliding tendency is averted. This operation of the automatic brake-control apparatus 64 may be repeated a number of times before the aircraft is brought to rest and, as a result of the periodic application and release of the braking pressure, pressure surges are likely to occur between the pilot's control valve 59 and the automatic brake-control apparatus 64, and these surges are likely to cause, or to accentuate, judder or vibration of the oleo-struts as previously referred to.

The introduction of the fluid-pressure damper 5 into the braking pressure line 62 smooths down the pressure surges in the following manner:

With the passages 35 blocked by the piston 26, fluid-pressure within the housing 6 must pass along the helical groove 22 in the plunger 21 in its passage between the inlet and outlet ends of the housing. Upon each momentary application of the brake by the automatic brake-control apparatus 64 a small volume of pressure-fluid passes from the interior 25 of the tubular member 24 to the brake space 55 and the pressure differential between the interior of the housing 6 and the interior of the tubular member 24 causes the plunger 21 to be moved further into the bore 25 of the tubular member 24 by the piston-like member, compressing the spring 19 and moving more of the groove 22 into the bore 25 and thus increasing the resistance to the flow of pressure-fluid along the groove 22 into the bore 25. At the same time, the spring 19 is endeavouring to urge the guide 12 away from the tubular member 24 and so to withdraw the plunger 21 from the bore 25, so that there is a substantially-balanced force working in opposite directions upon the plunger. Accordingly, in the momentary intervals between successive brake applications, when there is no fluid-pressure flow to the brake, the plunger tends to withdraw from the bore 25 and thus to lessen the flow resistance of the groove 22. This reduces the resistance of the plunger and groove to the reverse flow of pressure-fluid and accordingly substantially damps, or smooths out, the pressure surges between the damper and the brake and largely prevents judder or vibration of the oleo-struts.

On releasing the brake, fluid-pressure therein flows to a reservoir or to atmosphere through the control valve mechanism 59 and as soon as the pressure in the brakes falls below said predetermined value the piston spring 31 moves the piston 26 back to its initial position in which the passages 34, 35 are in register. The plunger 21 is also returned to its original position by the spring 19.

The spring-loaded non-return valve 37 prevents the fluid-pressure in the bore 25 of the tubular member 24, piston bore 30 and brake space 55 from exceeding that in the housing 6, thus ensuring the full disengagement of the brakes upon the release thereof.

Whilst reference has been made in the foregoing description to specific forms of brake control-valve mechanism, rotary-inertia brake-control apparatus and disc brakes it will be clear to those skilled in the art that the fluid-pressure damper herein described is readily applicable to other known devices and mechanisms of an analogous nature.

The term "fluid-pressure" as used herein is used in its broadest sense as referring to either liquid or gaseous fluid.

Having now described my invention, what I claim is:

1. A damper to dampen surges of pressure fluid which comprises a housing having an inlet to receive fluid under pressure, an outlet to deliver fluid to a fluid pressure operated device and a passage for the flow of said fluid from said housing to said outlet, a valve in said housing spring pressed to open position to admit said fluid to said passage and movable by pressure in said outlet to closed position, said passage having an inlet opening in said housing, a flow restricting element movable inwardly of said opening to restrict flow of fluid through said opening into said passage, upon a pressure drop from said housing to said passage upon the closing of said valve, and means biasing said restricting element in opposition to said pressure drop.

2. The damper of claim 1 in which said valve is a cylindrical valve in said passage having a stepped outer surface to provide a larger cross-sectional area to the outlet end of said passage than to the inlet end thereof.

3. The damper of claim 2 in which said valve and said passage have ports communicating when said valve is in open position and in which said passage is provided with a spring pressing said valve to open position.

4. The damper of clam 1 in which said flow restricting element comprises a plunger co-axial with said passage and movable through the inlet opening thereof and having a narrow channel for the passage of fluid into said passage, a piston connected to said plunger in said passage and a spring biasing said piston and plunger to withdraw said plunger from said passage.

5. A fluid pressure damper comprising a housing, a tubular member disposed in said housing, the bore of said member opening at one end to a fluid outlet and being open at the opposite end to said housing, the housing opening to a fluid inlet, a hollow piston slidable in said bore and having a port in its wall, said tubular member having a passage formed in its wall, said port registering with said passage to establish communication between the housing and the piston bore when the piston is one axial position, and a spring urging said piston to said one position, the piston being adapted to be displaced axially by pressure in the outlet when said pressure exceeds the pressure in the housing so as to move the ports out of register and restrict and prevent flow therethrough and a restrictive element movable to restrict the opening of said tubular member progressively from said housing when said port and passage are out of register.

6. A damper as claimed in claim 5 wherein successive portions of the bore of the tubular member are of different diameters and said piston has portions of corresponding diameters, so that movement of the piston against the spring is limited and prevented when said portions coincide.

7. A damper as claimed in claim 5 wherein a further passage is formed in the tubular member and a relief valve is located in said further passage, so that an excess of pressure in the member is vented through said valve.

8. A fluid pressure damper comprising a housing having an inlet at one end and an outlet at the opposite end, an open ended tubular member in said housing having one end mounted to open to said outlet and the opposite, free end facing the inlet, a plunger slidable in the end of the tubular member facing said inlet to restrict the flow of fluid from the housing into the tubular member in accordance with the position of said plunger, said tubular member having ports establishing communication between the interior of said member and the housing, a piston slidable in said member and having ports to coincide with the ports of said member and out of coincidence with said ports to close communication between said tubular member and said housing, a spring biasing the plunger towards the inlet and out of the tubular member, and a second spring biasing the piston into position with said ports coinciding so that pressure reductions in the outlet cause the plunger to enter further the tubular member and reduce flow into the outlet, and pressure increases in the outlet displaces the piston to prevent flow between the tubular member and the housing.

9. A damper as claimed in claim 8 having a piston-like guide member slidable in the housing and formed with passages therethrough to permit flow from the inlet into the housing and secured to said plunger for displacement therewith when pressure in the inlet exceeds that in the outlet, and said spring urging the plunger acts via the guide member to return the latter and the plunger when pressure in the housing is restored to that in the inlet.

10. A damper as claimed in claim 8 wherein the end of the plunger remote from the inlet is formed with axially extending flutes, and the remainder of the plunger is grooved helically.

11. A damper as claimed in claim 8 wherein successive portions of the bore of the tubular member are of different diameters and the piston has portions of corresponding diameters so that movement of the piston against the spring is prevented when said portions coincide.

12. A damper as claimed in claim 8 wherein a further passage is formed in said tubular member and a relief valve is located in said further passage so that excess of pressure in said tubular member is vented into the housing.

References Cited in the file of this patent

UNITED STATES PATENTS

| | | |
|---|---|---|
| 2,590,368 | Beck | Mar. 25, 1952 |
| 2,729,234 | Stevenson | Jan. 3, 1956 |
| 2,753,017 | Curl et al. | July 3, 1956 |
| 2,877,800 | Mortimer | Mar. 17, 1959 |